US011829861B2

(12) United States Patent
Choi et al.

(10) Patent No.: US 11,829,861 B2
(45) Date of Patent: Nov. 28, 2023

(54) METHODS AND APPARATUS FOR EXTRACTING DATA IN DEEP NEURAL NETWORKS

(71) Applicants: UNIST (ULSAN NATIONAL INSTITUTE OF SCIENCE AND TECHNOLOGY), Ulsan (KR); INEEJI, Ulsan (KR)

(72) Inventors: Jae Sik Choi, Ulsan (KR); Hae Dong Jeong, Ulsan (KR); Gi Young Jeon, Ulsan (KR)

(73) Assignees: UNIST (ULSAN NATIONAL INSTITUTE OF SCIENCE AND TECHNOLOGY), Ulsan (KR); INEEJI, Ulsan (KR)

( * ) Notice: Subject to any disclaimer, the term of this patent is extended or adjusted under 35 U.S.C. 154(b) by 512 days.

(21) Appl. No.: 16/642,579

(22) PCT Filed: Aug. 30, 2019

(86) PCT No.: PCT/KR2019/011184
§ 371 (c)(1),
(2) Date: Feb. 27, 2020

(87) PCT Pub. No.: WO2021/010540
PCT Pub. Date: Jan. 21, 2021

(65) Prior Publication Data
US 2021/0406643 A1 Dec. 30, 2021

(30) Foreign Application Priority Data

Jul. 17, 2019 (KR) .................. 10-2019-0086410
Aug. 30, 2019 (KR) .................. 10-2019-0107302

(51) Int. Cl.
G06N 3/04 (2023.01)
G06N 3/047 (2023.01)
G06N 3/08 (2023.01)

(52) U.S. Cl.
CPC .............. G06N 3/047 (2023.01); G06N 3/08 (2013.01)

(58) Field of Classification Search
CPC ........ G06N 3/0472; G06N 3/08; G06N 5/045; G06N 5/003
See application file for complete search history.

(56) References Cited

U.S. PATENT DOCUMENTS 8,923,655 B1 12/2014 Weston et al.
2008/0281767 A1 11/2008 Garner
(Continued)

FOREIGN PATENT DOCUMENTS

KR 101326914 B1 11/2013
KR 20180008247 A 1/2018
(Continued)

OTHER PUBLICATIONS

Mallapragada et al., "SemiBoost: Boosting for Semi-Supervised Learning". IEEE Transactions on Pattern Analysis and Machine Intelligence, vol. 31, No. 11, Nov. 2009 (Year: 2009).*
(Continued)

Primary Examiner — Qian Yang
(74) Attorney, Agent, or Firm — Heslin Rothenberg Farley & Mesiti PC; Rachel L. Pearlman, Esq.

(57) ABSTRACT

Disclosed is a method and apparatus for extracting data in a deep learning model. The method includes receiving an input query, determining a first decision boundary set being a subset of a decision boundary set corresponding to a target layer of the deep learning model, extracting a decision region including the input query based on the first decision
(Continued)

boundary set, and extracting data included in the decision region.

15 Claims, 6 Drawing Sheets

(56) References Cited

U.S. PATENT DOCUMENTS

| | | | |
|---|---|---|---|
| 2010/0174435 A1* | 7/2010 | Lim | G05D 1/0217 |
| | | | 701/25 |
| 2012/0078821 A1 | 3/2012 | Ma et al. | |
| 2013/0129220 A1* | 5/2013 | Sato | G06F 18/00 |
| | | | 382/190 |
| 2014/0350900 A1 | 11/2014 | Lee et al. | |

FOREIGN PATENT DOCUMENTS

| | | |
|---|---|---|
| KR | 20180049786 A | 5/2018 |
| KR | 101897962 B1 | 10/2018 |
| WO | 2016144523 A1 | 9/2016 |

OTHER PUBLICATIONS

"Active Decision Boundary Annotation with Deep Generative Models" Miriam Huijser, et al. 2017 IEEE International Conference on Computer Vision, 10 pages.

"Decision Boundary Feature Extraction for Neutral Networks" Chulhee Lee, et al. IEEE Transactions on Neutral Networks, vol. 8, Jan. 1, 1997. 9 pages.

\* cited by examiner

METHODS AND APPARATUS FOR EXTRACTING DATA IN DEEP NEURAL NETWORKS

CROSS REFERENCE TO RELATED APPLICATIONS

This application is a national stage filing under section 371 of International Application No. PCT/KR2019/011184, filed on Aug. 30, 2019, which claims priority to Korean Application No. 10-2019-0086410, filed on Jul. 17, 2019 and Korean Application No. 10-2019-0107302, filed on Aug. 30, 2019. The entire contents of PCT/KR2019/011184 are hereby incorporated herein by reference.

TECHNICAL FIELD

Embodiments relate to a method and apparatus for extracting data in a deep learning model.

BACKGROUND ART

Artificial Intelligence become an essential components in many fields when a large amount of training data and real-time internet of things (IoT) sensors are available. Machine learning models and algorithms will play an important role in automation of several knowledge work. Deep neural network models trained with big data, so-called deep learning, recently show competitive performance in several recognition tasks. Recent advances in deep neural networks have made breakthrough in several application areas including computer vision, natural language processing, speech recognition.

However, there are several challenges to utilize the advanced deep neural networks in the broader fields of applications. One of the most important challenges is to explain the internal decision mechanisms of deep neural networks. When the network makes a decision in mission critical systems in healthcare devices, military systems and autonomous vehicles, it may be necessary to analyze the internal nodes and their working mechanisms. However, due to numerous parameters in several hidden layers combined with non-linear (activation) function, it is non-trivial to investigate how input data is processed inside of the deep neural networks. Existing explainability methods are not only ambiguous to human perception but also venerable to inaccurate explanations. There are not many methods presented for general tools which can be used for several deep neural networks instead of applicable to specific model architectures.

DISCLOSURE OF INVENTION

Technical Goals

Practical examples include extracting sample data which share the same internal, neural representation in deep neural networks.

Practical examples include analyzing and improving pretrained deep neural networks models based on the extracted common features and samples data.

Practical examples include deciding internal area of deep neural networks where data samples share the identical classification or generation information.

Practical examples include finding boundaries which separate the data based on the classification and generation of data samples.

Practical examples include analyzing homogeneity of data samples separated by decision or generative boundaries to improve the quality of the pretrained model.

Practical examples include automated selective retraining of deep neural networks models to improve the performance of classification and generations for the regions with non-homogeneous data samples.

Technical Solutions

According to an aspect, there is provided a method of extracting data in a deep learning model, the method including receiving an input query, determining a first decision boundary set being a subset of a decision boundary set corresponding to a target layer of the deep learning model, extracting a decision region including the input query based on the first decision boundary set, and extracting data included in the decision region.

The method may further include re-training the deep learning model based on the extracted data.

The determining of the first decision boundary set may include determining a distribution probability of decision boundaries included in the decision boundary set, and determining the first decision boundary set based on the distribution probability of the decision boundaries.

The determining of the first decision boundary set based on the distribution probability of the decision boundaries may include determining decision boundaries of which a distribution probability is greater than or equal to a threshold, among the decision boundaries, to be the first decision boundary set.

Calculating of the distribution probability of the decision boundaries included in the decision boundary set may include determining Bernoulli parameters of the decision boundaries.

The determining of the Bernoulli parameters may include determining the Bernoulli parameters based on a loss function corresponding to the target layer.

The extracting of the data may include extracting the data based on a rapidly-exploring random tree (RRT) algorithm having the decision region as a constraint.

According to an aspect, there is provided an apparatus for extracting data in a deep learning model, the apparatus including a processor configured to receive an input query, determine a first decision boundary set being a subset of a decision boundary set corresponding to a target layer of the deep learning model, extract a decision region including the input query based on the first decision boundary set, and extract data included in the decision region.

The processor may be configured to re-train the deep learning model based on the extracted data.

The processor may be configured to determine a distribution probability of decision boundaries included in the decision boundary set, and determine the first decision boundary set based on the distribution probability of the decision boundaries.

The processor may be configured to determine decision boundaries of which a distribution probability is greater than or equal to a threshold, among the decision boundaries, to be the first decision boundary set.

The processor may be configured to determine Bernoulli parameters of the decision boundaries.

The processor may be configured to determine the Bernoulli parameters based on a loss function corresponding to the target layer.

The processor may be configured to extract the data based on an RRT algorithm having the decision region as a constraint.

Effects

The practical examples include to extract data samples which share the classification or generation information in deep neural network models.

The practical examples include to improve deep neural network models based on the extracted data.

The practical examples include to decide the regions based on the classification and/or generation distributions of deep neural network models.

The practical examples include to decide the boundaries of regions based on the classification and/or generation distributions of deep neural network models.

The practical examples include to analyze the integrity of deep neural network models based on the homogeneity of data samples in the same set of decision/generation boundaries.

The practical examples improve deep neural network models by improving the not-so properly trained regions based on the integrity of data samples.

BEST MODE FOR CARRYING OUT THE INVENTION

Figure 1:
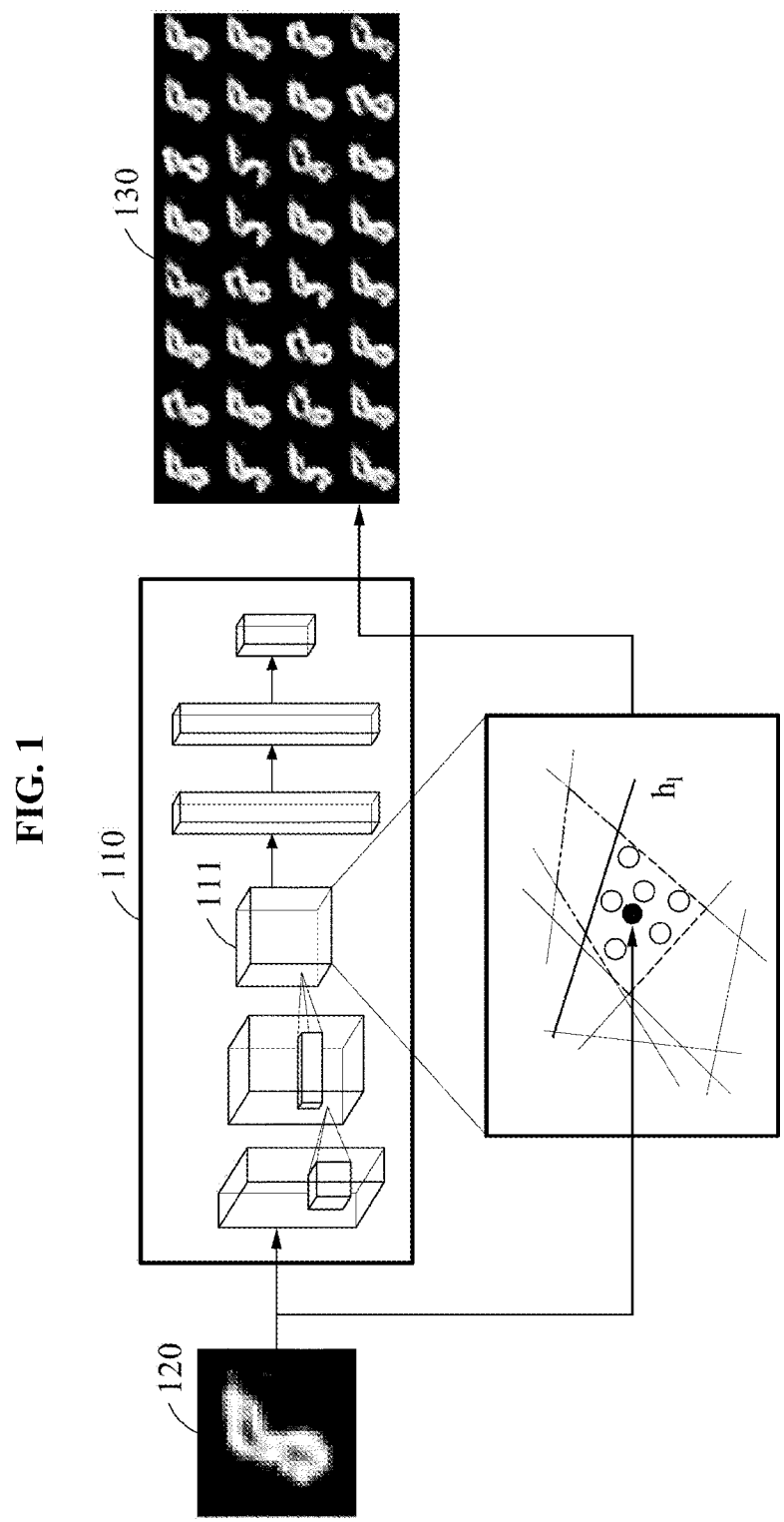
FIG. 1 explains the way to extract data samples from deep neural networks models.

The following detailed structural or functional description is provided as an example only and various alterations and modifications may be made to the embodiments. Accordingly, the embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The embodiments described herein may be implemented as various types of products such as, for example, a personal computer, a laptop computer, a tablet computer, a smart phone, a television, a smart home appliance, an intelligent vehicle, a kiosk, and a wearable device. Hereinafter, the embodiments will be described in detail with reference to the accompanying drawings. Like reference numerals in the drawings denote like elements FIG. 1 explains the method to extract data samples in a deep neural networks in the practical examples.

Recent advances in deep learning demonstrates superhuman performance in several applications areas including image understanding, natural language processing, autonomous navigation and time series data predictions. However, numerous nodes in many stacked hidden layers prevent human from understanding the internal mechanism. Therefore, internal mechanisms of deep neural networks are hard to investigate. The deep neural networks often regarded as black boxes.

According to FIG. 1, one input query (120) can be used to derive one output data sample (130) in the deep neural networks (110). Data sample (130) can be closely related to the input query (120). As an example, when the deep neural networks (110) is trained to classify input data, the data sample (130) can be closely related to the input query (120). As an example, when the input query (120) is the number '8', data sample (130) include information about number '8' in the specific hidden layer (111) in the deep neural network (110).

In the practical example, deep neural networks (110) can be previously trained before analyzed. The pretrained deep neural networks (110) may classify input data based on activated nodes in the hidden layers. The, the set of activated nodes in a specific layer can be used to form decision boundaries (in case of classification models) or generative boundaries (in case of generative models). The decision/generation boundaries of deep neural networks (110) are trained to minimize the loss between the true values and the ones predicted by the models. In each layer, there are many decision/generation regions. Data samples in each region are homogeneous in perspective of final decision of model.

However, there are too many decision boundaries and regions in deep neural networks (110). Therefore, in practice, it is non-trivial to investigate all regions.

To address this issue, existing methods ignore such decision/generation boundaries and compute the Euclidean distance between the input query (120) and data samples to investigate the internal mechanism of deep neural networks (110). However, the Euclidean distance is computed without considering the several decision/generation boundaries and constraints which are essential to the decision of deep neural networks.

According to the data extraction method in practical examples, the important decision/generation boundaries are selected to extract data samples for the input query (120). Furthermore, the pretrained deep neural networks (110) can be improved based on the data samples searched.

Figure 2:
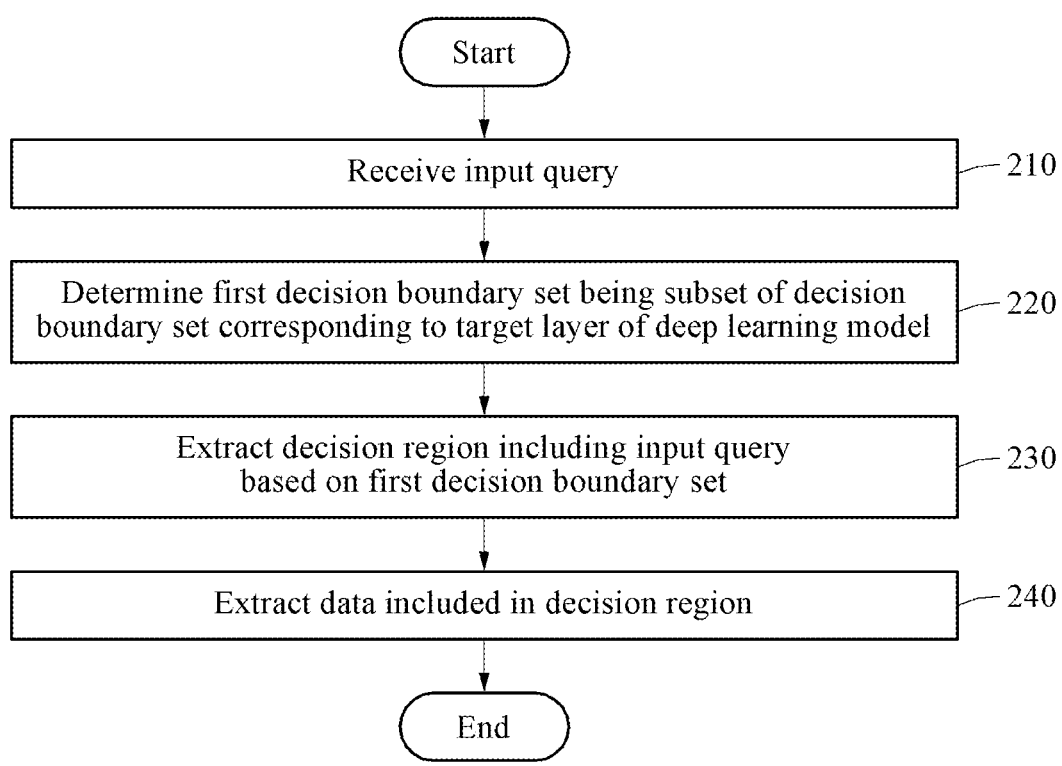
FIG. 2 is the flow chart to explain the method to extract data samples in deep neural networks in the practical examples.

FIG. 2 is a flow chart to explain the data extraction procedure for deep neural networks.

As shown in FIG. 2, procedures (210 and 240) are conducted by data extraction devices. Data extraction device can be composed of one or more hardware modules and one or more software modules and various combination of hardware and software modules.

In the procedure (210), the data extraction device receives input query. Input query is the main interest of analysis.

In the procedure (220), data extraction device decides the first set of decision/generation boundaries which is an important subset of decision/generation boundaries set corresponding to a target layer of the deep learning model. A possible deep neural network (110) and a specific layer (120) is respectively explained in FIG. 1.

Figure 3:
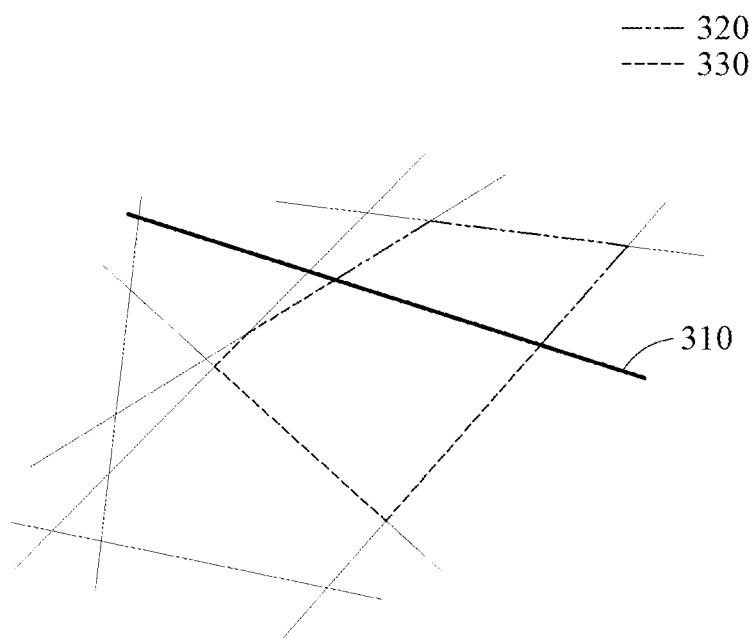
FIGS. 3 and 4 explains the decision/generative boundaries and their first or dominant boundaries.
Figure 4:
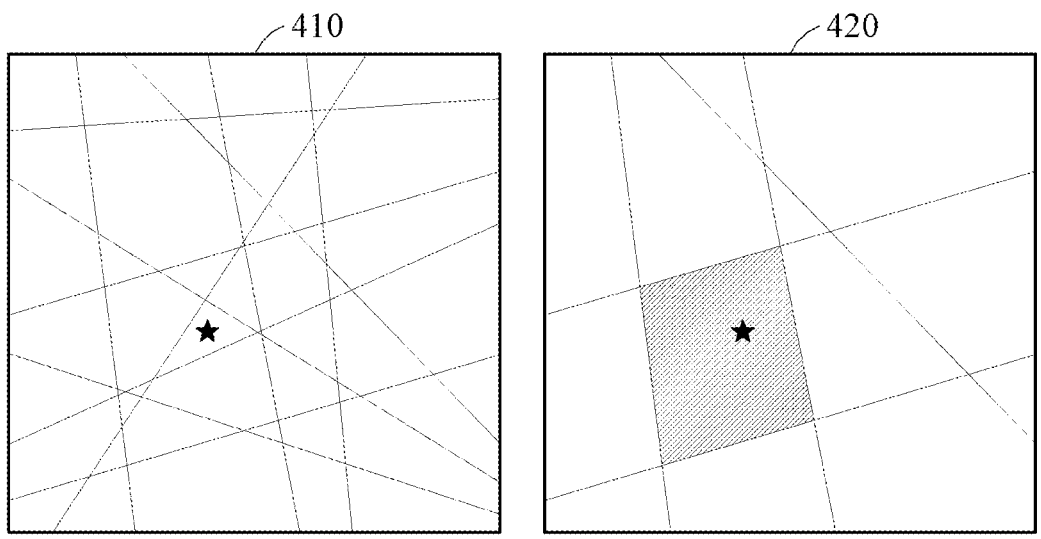

The first set or 'the first decision boundaries' includes the decision/generation boundaries which are essential to make the decision of the neural network. FIGS. 3 and 4 explain the detail procedure to select the first decision boundary.

In the procedure (230), the data extraction device determines the decision region based on the first decision boundaries and input query. The data extraction device can efficiently extract the specific decision region out of all the possible regions.

In the procedure (240), the data extraction device extract data samples included in the first decision boundaries which can be called the data exploration step. Data can be the one (130) in FIG. 1. The detail procedure is explained in FIG. 5.

Figure 6:
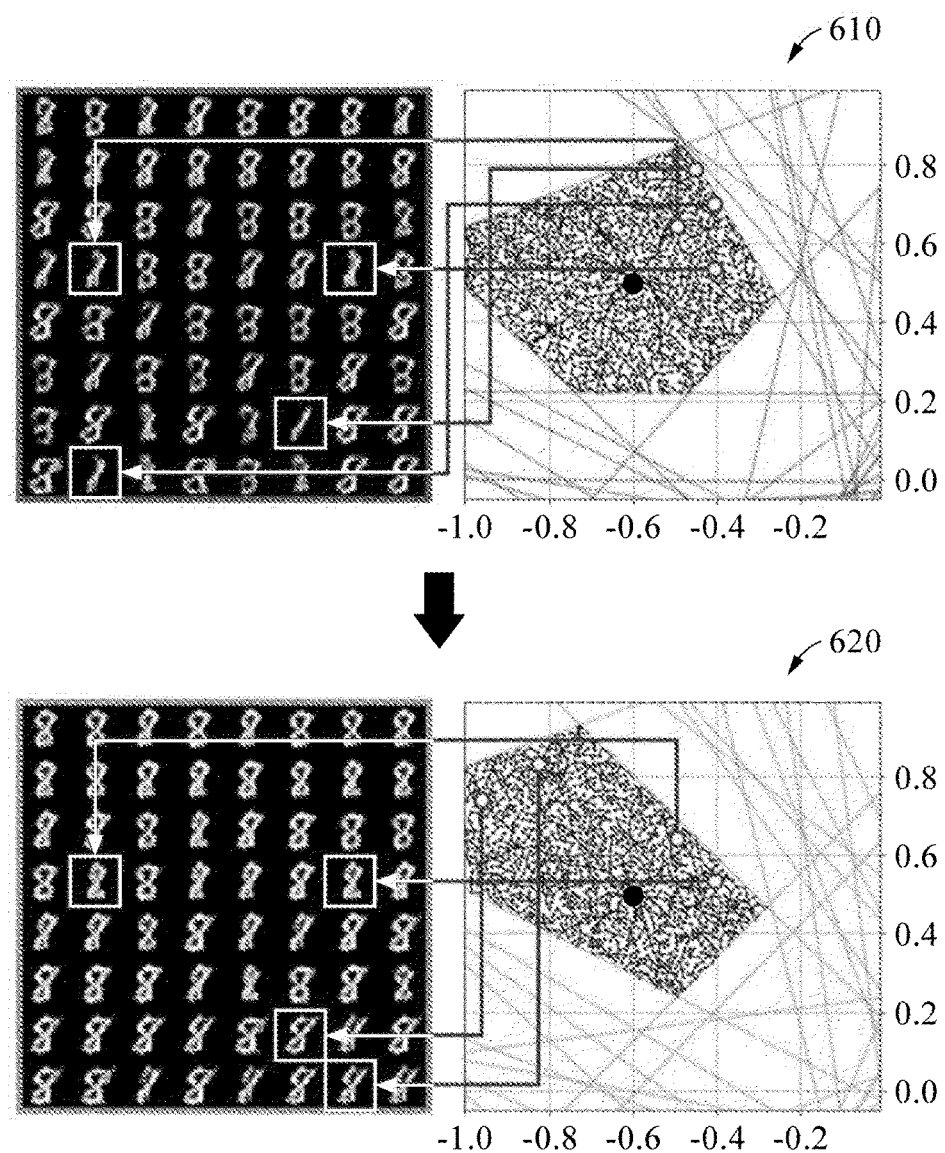
FIG. 6 is an illustrative example to improve not-so-properly trained regions in a deep neural networks model.

The data extraction device can improve the pretrained deep neural network based on the data samples explored in the previous steps. As an example, the data extraction device can decide to retrain the first decision boundaries when necessary. FIG. 6 explains detailed procedure to analyze and improve deep neural network models.

FIG. 3 and FIG. 4 are illustrative examples to explain the first decision boundaries.

As shown in FIG. 3, it is non-trivial to extract and analyze all the internal regions of deep neural networks, the data extraction device can first select a set of important (essential to the decision of the neural network) boundaries and then analyze the region bounded by the first boundaries. There are many possible methods to select the first boundaries. As an example, one can select the first boundaries uniformly random. An alternative is to measure the similarity of two conjoined regions (320) and (330). When the similarity of two regions are lower than a threshold, the device can determine that the boundary (310) is included in the first boundaries.

According to the practical example, the data extract device can extract the smallest supporting decision boundary (SSDB) set which can maintain the minimum quality of data generation/classification. The SSDB set should satisfied the following two conditions. First, given the query z0, all the data z which are included in the decision boundary should satisfy $\|G(z)-G(z_0)\| \leq \delta$. $\delta$ is the threshold, G(z) is the output of the model when z is given as an input. Second, the set of decision boundary should include the minimum number of elements which satisfied the first condition. When a set of decision boundary satisfies the two conditions, the set is the SSDB set.

According to the practical examples, the data extraction device extracts the first decision boundaries based on the distribution probability of decision boundaries. The device can optimize the distribution probability of decision boundaries, and determine decision boundaries of which a distribution probability is greater than or equal to a threshold (for example, 0.5), among the decision boundaries, to be the first decision boundary set. The distribution probability of decision boundaries can be optimized in the form of Bernoulli parameters. In one example, the data extraction device can optimize the Bernoulli parameter to minimize the loss function corresponding to the target layer.

For each, decision boundary, the selection probability, Bernoulli parameter, are trained as shown in Algorithm 1. Algorithm 1 optimize the Bernoulli parameter for each boundary by minimizing loss of the output models.

| Algorithm 1 Bernoulli Mask Optimization (BerOpt) |
|---|
| Input: $z_0$: query, G(.) = $f_{L:1}(.)$: DGNN model, l: target layer |
| Output: θ: optimized Bernoulli parameter to select SSGBS |
| 1:                 Initialize θ ∈ [0, 1]$^{dim(f(.))}$ |
| 2:                 while not coverge do |
| 3:                 Sample m ~ Ber(θ) |
| 4:                 $h_0 = f_{l:1}(z_0)$ |
| 5:                 $h_m = h_0 \odot m$ |
| 6:                 $x = f_{L:l+1}(h_0), x_m = f_{L:l+1}(h_m)$ |
| 7:                 Compute loss L(x, $x_m$, θ) |
| 8:                 Update θ with $\nabla_\theta L$ |
| 9:                 return θ |

In Algorithm 1, SSGBS is the Smallest Supporting Generative Boundaries Set, θ is the Bernoulli parameter, L is the loss function, ⊙ is the elementwise multiplication operation, $f_{l:1}(z_0)$ is the output of the first internal layer of zo, $f_{L:l+1}(h_m)$ is the final output of the value hm at layer l. Instead of SSGBS, SSDBS can be used for the classification model.

As shown in FIG. 4, the region (410) show all the decision boundaries and the region (420) show the first decision boundaries. For example, the region (420) is defined by decision boundaries where the Bernoulli parameters are greater or equal to 0.5.

Figure 5:
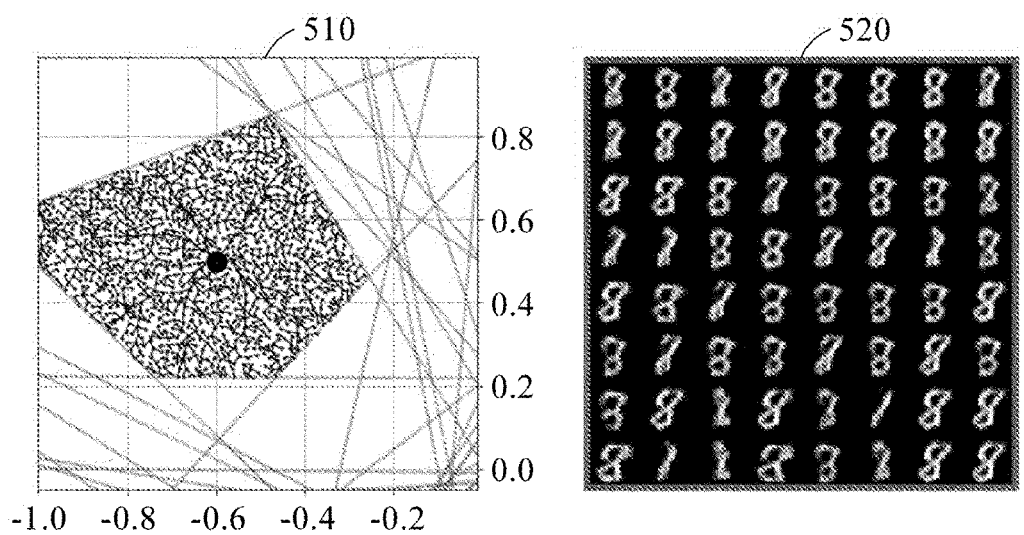
FIG. 5 is an illustrative example to extract data samples in the practical examples.

FIG. 5 explains the practical examples to extract data.

As shown in FIG. 5, the data extraction device can extract data inside the decision region (e.g., the number '8'). The region (510) include the region with the input query, numbers in (520) demonstrate the digits generated in the region.

According to the practical examples, the data extraction device can accurately generate data compared to existing methods based on Euclidian distance. As an example, when the boundaries are not convex (e.g., star shape or highly non-convex), the data extraction of practical examples are accurate since Euclidian distance based method assume that the boundary are either spherical shape or cube shape.

Furthermore, when the region (510) can be efficiently extracted by the first boundaries, Therefore, as in the practical examples, the data extraction device can efficiently extract decision boundaries and decision regions.

The data extraction device can extract data samples in the same boundaries of the input query. As an example, the data extraction device can generate data samples based on Algorithm 2 which is implemented with the RRT (Rapidly-Exploring Random Tree) algorithm having the decision region as a constraint.

---
Algorithm 2 Rapidly-exploring Random Tree (RRT)
---

Input: $z_0$: query, S: a set of halfspaces, I: sampling interval
N: maximum number of iteration, δ: step size
Output: Q: samples in the SSGR
1:        Initialize queue $Q_0 = \{z_0\}$
2:        for i = 1 ... N do
3:           Sample $z_i \sim U(z_0 - I, z_0 + I)$
4:           $q_i = \text{nearest}(Q_{i-1}, z_i)$
5:           $z_i' = (z_i - q_i) / \|z_i - q_i\| * \delta + q_i$
6:           if $z' \in$ GRS and
                  $M(z', \text{nearest}(Q_{i-1}, z')) > \delta$ then
7:              $Q_i = Q_{i-1} \cup \{z'\}$
8:        return $Q_N$ According to Algorithm 2, the data extraction device selects a data sample which is close to the input query. Then, the tree is expanded by the unit step size toward the data sample. When the data point is inside of the decision boundaries, the data point is chosen. The procedure is repeated until the predefined step.

FIG. 6 presents method to improve the pretrained deep neural networks.

According to FIG. 6, the region (610) is the first boundaries decided in the practical examples. Based on the region (610), internal mechanisms of deep neural networks can be analyzed. As an example, when there is an unexpected data sample is included in the decision boundaries, one can decide that the decision region is not properly trained.

The region (620) presented the retrained deep neural networks (the first decision boundaries), the decision region and the data sample. It is clear to see that the data samples generated in the region (620) are more robust.

The data extraction method in practical examples (classification problems and generation problems) can be applicable to broader areas of applications. Therefore, the practical examples are general enough to be applicable to various types of deep neural networks.

The practical examples in the data extraction device include the processors. The data extraction device can include memory and communication devices. Processors, memory and communication modules can communicate through the shared bus.

The processor receive the input query, and decide the first decision boundaries, Decision regions are extracted based on the decision boundaries to explore data in the same decision boundaries.

Here, memory include volatile memories and non-volatile memories.

According to practical example, the processors can retrain the deep neural networks based on the data.

Processors can determine the distribution of decision/generation boundaries and finally determine the first decision boundaries.

Processors may decide the Bernoulli parameters of deep neural networks.

Processors may determine the final Bernoulli parameters or deep neural networks based on the loss function.

Processors can extract data which satisfies the decision region based on the RRT algorithm.

In addition, the processor may perform at least one of the methods described with reference to FIGS. 2 through 6 or an algorithm corresponding to at least one of the methods. The processor may execute a program and control the data extraction apparatus. Program codes to be executed by the processor may be stored in the memory. The data extraction apparatus may be connected to an external device (for example, a personal computer or a network) through an input/output device (not shown) and exchange data with the external device. The data extraction apparatus may be mounted on various computing devices and/or systems such as, for example, a smart phone, a tablet computer, a laptop computer, a desktop computer, a television, a wearable device, a security system, and a smart home system.

The embodiments described herein may be implemented using hardware components, software components, and/or the combination of hardware components and software components. For example, the apparatuses, methods, and components described in the embodiments may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method of extracting data in a deep learning model, the method comprising:
　receiving an input query;
　determining a first decision boundary set, wherein the first decision boundary is a subset of a decision boundary set corresponding to a target layer of the deep learning model, wherein the first decision boundary set surrounds a decision region, wherein the determining of the first decision boundary set comprises:
　　determining a distribution probability of decision boundaries included in the decision boundary set, wherein determining the distribution probability of the decision boundaries comprises optimizing the distribution probability of the decision boundaries by minimizing a loss function corresponding to the target layer; and
　　determining the first decision boundary set based on the distribution probability of the decision boundaries;
　extracting the decision region, wherein the decision region comprises the input query, the extracting based on the first decision boundary set; and
　extracting data included in the decision region to determine if the decision region is properly trained, the determining comprising:
　　determining that a data sample in the extracted data is unexpected; and
　　based on the determining, retraining the decision region, wherein the retraining narrows the first decision boundary set and the decision area, wherein the narrowed decision region comprises more robust data samples than the decision regions.

2. The method of claim 1, wherein retraining the decision region comprises re-training the deep learning model based on the extracted data.

3. The method of claim 1, wherein the determining of the first decision boundary set based on the distribution probability of the decision boundaries comprises determining decision boundaries of which a distribution probability is greater than or equal to a threshold, among the decision boundaries, to be the first decision boundary set.

4. The method of claim 1, wherein determining the distribution probability of the decision boundaries included in the decision boundary set comprises determining Bernoulli parameters of the decision boundaries.

5. The method of claim 4, wherein minimizing the loss function corresponding to the target layer comprises optimizing the Bernoulli parameters.

6. The method of claim 1, wherein the extracting of the data comprises extracting the data based on a rapidly-exploring random tree (RRT) algorithm having the decision region as a constraint.

7. The method of claim 1, wherein a shape of the region is a cube shape.

8. A non-transitory computer-readable storage medium storing instructions that, when executed by a processor, causes the processor to perform the method, the method comprising:
　receiving an input query;
　determining a first decision boundary set, wherein the first decision boundary is a subset of a decision boundary set corresponding to a target layer of the deep learning model, wherein the first decision boundary set surrounds a decision region, wherein the determining of the first decision boundary set comprises:
　　determining a distribution probability of decision boundaries included in the decision boundary set, wherein determining the distribution probability of the decision boundaries comprises optimizing the distribution probability of the decision boundaries by minimizing a loss function corresponding to the target layer; and
　　determining the first decision boundary set based on the distribution probability of the decision boundaries;
　extracting the decision region, wherein the decision region comprises the input query, the extracting based on the first decision boundary set; and
　extracting data included in the decision region to determine if the decision region is properly trained, the determining comprising:
　　determining that a data sample in the extracted data is unexpected; and
　　based on the determining, retraining the decision region, wherein the retraining narrows the first decision boundary set and the decision area, wherein the narrowed decision region comprises more robust data samples than the decision regions.

9. An apparatus for extracting data in a deep learning model, the apparatus comprising:
　a processor configured to receive an input query, determine a first decision boundary set being a subset of a decision boundary set corresponding to a target layer of the deep learning model, extract a decision region, wherein the decision region comprises the input query, the extracting based on the first decision boundary set, and extract data included in the decision region,
　wherein the processor is configured to determine a distribution probability of decision boundaries included in the decision boundary set, and determine the first decision boundary set based on the distribution probability of the decision boundaries, wherein determining the distribution probability of the decision boundaries comprises optimizing the distribution probability of the decision boundaries by minimizing a loss function corresponding to the target layer,
　wherein extracting data included in the decision region comprises determining if the decision region is properly trained, the determining comprising:
　　determining that a data sample in the extracted data is unexpected; and
　　based on the determining, retraining the decision region, wherein the retraining narrows the first decision boundary set and the decision area, wherein the narrowed decision region comprises more robust data samples than the decision regions.

10. The apparatus of claim 9, wherein retraining the decision region comprises retraining the deep learning model based on the extracted data.

11. The apparatus of claim 9, wherein the processor is configured to determine decision boundaries of which a distribution probability is greater than or equal to a threshold, among the decision boundaries, to be the first decision boundary set.

12. The apparatus of claim 9, wherein the processor is configured to determine Bernoulli parameters of the decision boundaries.

13. The apparatus of claim 12, wherein the processor is configured to minimize the loss function corresponding to the target layer by optimizing the Bernoulli parameters.

14. The apparatus of claim 12, wherein the processor is configured to extract the data based on a rapidly-exploring random tree (RRT) algorithm having the decision region as a constraint.

15. The apparatus of claim 9, wherein a shape of the region is a cube shape.

* * * * *